(12) United States Patent
Scholar

(10) Patent No.: US 11,551,705 B2
(45) Date of Patent: Jan. 10, 2023

(54) SYSTEMS AND METHODS FOR MACHINE-GENERATED AVATARS

(71) Applicant: True Image Interactive, Inc., Pittsburgh, PA (US)

(72) Inventor: Wayne Scholar, Mars, PA (US)

(73) Assignee: True Image Interactive, Inc., Pittsburgh, PA (US)

(*) Notice: Subject to any disclaimer, the term of this patent is extended or adjusted under 35 U.S.C. 154(b) by 173 days.

(21) Appl. No.: 16/872,753

(22) Filed: May 12, 2020

(65) Prior Publication Data

US 2020/0321020 A1 Oct. 8, 2020

Related U.S. Application Data

(63) Continuation of application No. 15/771,787, filed as application No. PCT/US2016/059467 on Oct. 28, 2016, now Pat. No. 10,672,417.

(60) Provisional application No. 62/248,109, filed on Oct. 29, 2015.

(51) Int. Cl.
| | |
|---|---|
| *G10L 15/25* | (2013.01) |
| *G10L 21/10* | (2013.01) |
| *G10L 13/08* | (2013.01) |
| *G10L 15/187* | (2013.01) |
| *G06T 13/40* | (2011.01) |
| *G10L 15/02* | (2006.01) |
| *G10L 15/06* | (2013.01) |

(52) U.S. Cl.
CPC .............. *G10L 21/10* (2013.01); *G06T 13/40* (2013.01); *G10L 13/08* (2013.01); *G10L 15/02* (2013.01); *G10L 15/063* (2013.01); *G10L 15/187* (2013.01); *G10L 15/25* (2013.01); *G10L 2015/025* (2013.01); *G10L 2021/105* (2013.01)

(58) Field of Classification Search
None
See application file for complete search history.

(56) References Cited

U.S. PATENT DOCUMENTS

| | | | | |
|---|---|---|---|---|
| 5,983,190 | A | * 11/1999 | Trower, II | G06F 3/0481 704/275 |
| 8,259,163 | B2 | 9/2012 | Bell | |
| 11,410,570 | B1 | * 8/2022 | Yang | G10L 15/02 |
| 2003/0216905 | A1 | 11/2003 | Chelba et al. | |

(Continued)

FOREIGN PATENT DOCUMENTS

WO 2014195359 A1 12/2014

OTHER PUBLICATIONS

International Search Report and Written Opinion issued in PCT/US16/059467, dated Mar. 10, 2017.

(Continued)

*Primary Examiner* — Seong-Ah A Shin
(74) *Attorney, Agent, or Firm* — BakerHostetler

(57) ABSTRACT

Systems and methods are disclosed for creating a machine generated avatar. A machine generated avatar is an avatar generated by processing video and audio information extracted from a recording of a human speaking a reading corpora and enabling the created avatar to be able to say an unlimited number of utterances, i.e., utterances that were not recorded. The video and audio processing consists of the use of machine learning algorithms that may create predictive models based upon pixel, semantic, phonetic, intonation, and wavelets.

20 Claims, 17 Drawing Sheets

(56) References Cited

U.S. PATENT DOCUMENTS

| | | | |
|---|---|---|---|
| 2004/0150641 A1 | 8/2004 | Duiker | |
| 2005/0140694 A1 | 6/2005 | Subramanian et al. | |
| 2008/0269958 A1 | 10/2008 | Filev et al. | |
| 2010/0057455 A1* | 3/2010 | Kim | 704/235 |
| 2011/0131041 A1* | 6/2011 | Cortez | G10L 15/16 704/235 |
| 2013/0050260 A1 | 2/2013 | Reitan | |
| 2013/0304587 A1* | 11/2013 | Ralston | G06Q 30/0275 705/14.67 |
| 2015/0070337 A1 | 3/2015 | Bell et al. | |
| 2015/0070351 A1* | 3/2015 | Tarquini | G06T 17/20 345/419 |
| 2015/0224640 A1* | 8/2015 | Vu | G06N 3/008 901/1 |
| 2015/0287403 A1* | 10/2015 | Holzer Zaslansky | G06T 13/205 704/231 |

OTHER PUBLICATIONS

International Preliminary Report on Patentability and Written Opinion issued in PCT/US 16/059467, dated May 11, 2018.

* cited by examiner

SYSTEMS AND METHODS FOR MACHINE-GENERATED AVATARS

CROSS-REFERENCE TO RELATED APPLICATIONS

This application is a continuation of U.S. patent application Ser. No. 15/771,787 filed Apr. 27, 2018, which is a National Stage Application filed under 35 U.S.C. § 371 of International Application No. PCT/US2016/059467 filed Oct. 28, 2016, and thereby claims benefit under 35 U.S.C. § 119(e) of U.S. Provisional Patent Application No. 62/248,109, filed on Oct. 29, 2015, and titled "Systems And Methods For Machine-Generated Avatars," the contents of which are incorporated by reference herein in their entirety.

TECHNICAL FIELD

The disclosed inventions are in the field of machine learning (ML). The disclosed inventions are also in the field of digital avatars.

BACKGROUND

Digital avatars may represent a person or thing in one or more virtual spaces and may also provide a user interface to enable human-computer interaction with a computer system. An avatar, being a virtual entity, may take any shape or form. For example, an avatar may be created based on a person's image and may comprise only forward-facing images. Avatars may understand human language and respond to inquiries presented to them by users. For example, a user may type or verbally ask, "What temperature is the weather outside?" The avatar, being associated with a computer system, may respond with, "The temperature outside is 60 degree Fahrenheit." Typically, responses to inquiries are programmed by one or more software engineers and comprise generic responses. If the response from the avatar is audible, the response is typically one that has been prerecorded by a voice actor or created based on specific words that have been taken from prerecorded sentences.

SUMMARY

Existing avatars may not appear lifelike because their speech may sound like their words were taken from different sentences and contexts and/or because their facial expressions do not match the words being spoken. A disparity between facial expressions and spoken words may remove a user from an otherwise immersive experience. Further, a user may not properly project himself into a virtual world if his avatar does not mirror his facial expressions and body language.

Systems and methods are disclosed for creating a machine-generated avatar. A machine-generated avatar is an avatar generated by processing video and audio information, comprised of a recording of a human speaking a reading corpora and enabling the created avatar to be able to say an unlimited number of utterances (i.e. not recorded). Moreover, the video and audio processing consists of the use of machine learning algorithms. The machine learning algorithms create predictive models based upon pixel, semantic, phonetic, intonation, and wavelets.

The processing methods are also comprised of extracting time series, phonemes, visemes, and semantics from a recorded corpus to create the prediction models. Additionally, the extracted data is transformed into matrices and geometric shapes for learning and prediction. Methods are also disclosed for generating a previously unknown (not recorded) utterance (sentences) by using an audio model to generate phoneme matrices and find corresponding viseme clips based upon extracted data such as timings, phoneme, and duration. Methods are also described for using a trained audio model to generate transition matrices for phoneme pairs. Furthermore, methods are described for using a trained video model to generate transitions for viseme frames. Also provided are methods for using a trained modulation mode to modulate phoneme and transition matrices to get correct intonation. Also provided are methods for generating combined video and audio output representing the desired utterance and a reproduction of the human originally recorded.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Systems and methods are disclosed for creating a machine generated avatar. A machine generated avatar is an avatar generated by processing video and audio information extracted from a recording of a human speaking a reading corpora and enabling the created avatar to be able to say an unlimited number of utterances, i.e., utterances that were not recorded. The video and audio processing consists of the use of machine learning algorithms that may create predictive models based upon pixel, semantic, phonetic, intonation, and wavelets.

An avatar may be created by one or more software entities on a computer system that work together. The entities may be stored together on a storage medium such as a database or other suitable computer memory. For purposes of explanation, this specification will refer to this computer memory as a Machine-Generated Avatar Database ("MGA"), and the software will collectively be referred to as an avatar creator.

Figure 1:
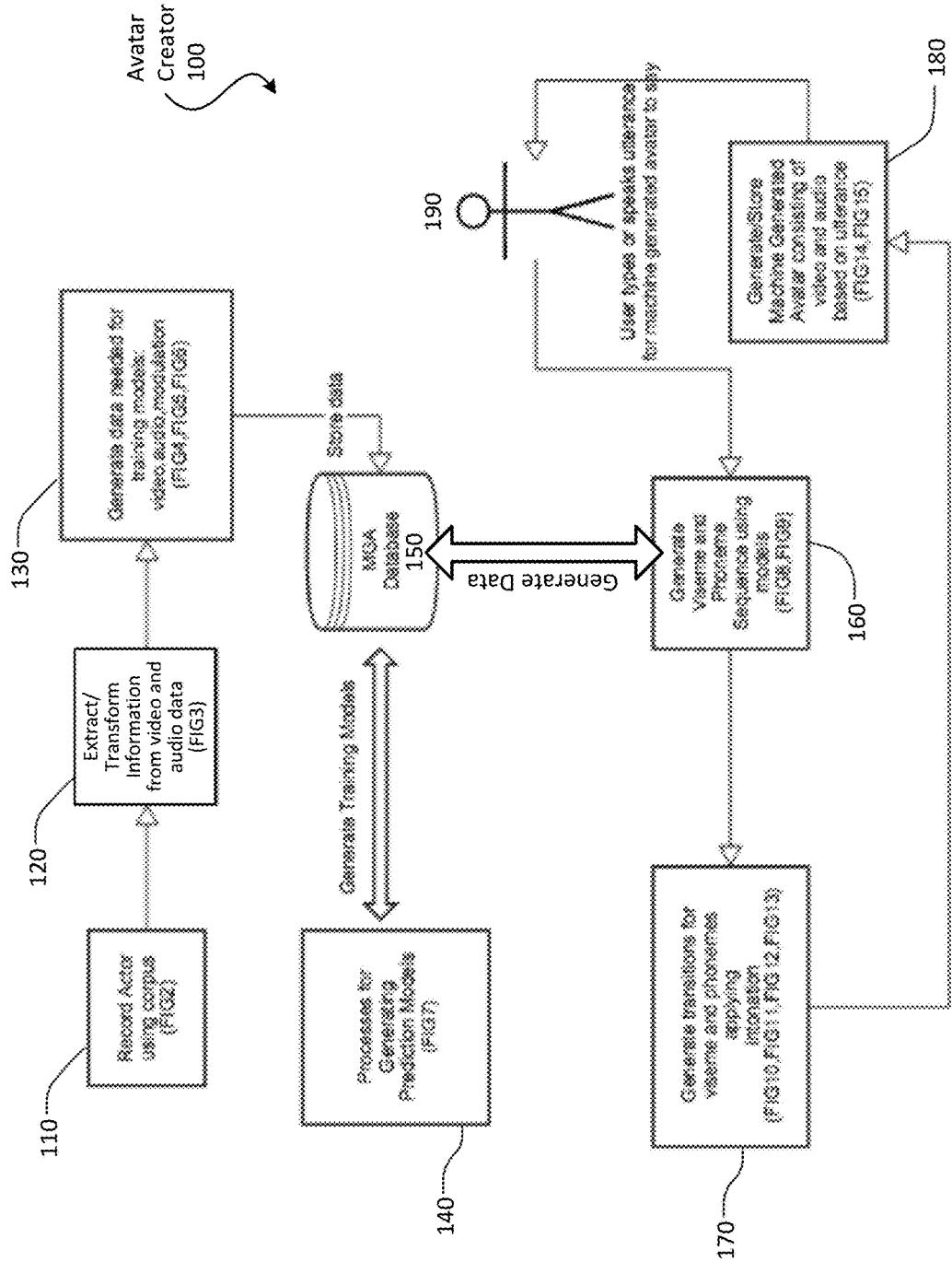
FIG. 1 depicts an example process for creating a machine generated avatar.

An example process of creating an avatar is shown by the flow diagram of FIG. 1. Before an avatar may be generated, the underlying models dictating the behavior of the avatar need to be created and trained on the data received from a user. The received data may be processed and reprocessed to generate better training models throughout the life of the avatar. These processing and training steps are depicted as blocks 110, 120, 130, and 140 in FIG. 1. The steps for generating the avatar experienced by a user are depicted as blocks 160, 170, 180, and the actions under the user 190.

At block 110, an avatar creator 100 may receive audio or video recordings, or both, of an actor reading a corpus or corpora of words, described below with respect to FIG. 2.

At block 120, the avatar creator 100 may then extract and transform information from the video and audio recordings, described below with respect to FIG. 3.

At block 130, the avatar creator 100 may then use this information to generate data needed for training video, audio, and modulation models, described below with respect to FIGS. 4, 5, and 6, respectively. This data is then stored in an MGA 150.

At block 140, the avatar creator 100 uses the data in the MGA 150 and processes described below with respect to FIG. 7 to generate prediction models, which are then stored in the MGA 150.

Now, a user 190 may type or speak an utterance it would like the avatar to say. At block 160, the avatar creator 100 receives the utterance and uses the models stored in the MGA 150 to generate a viseme and phoneme sequence of the utterance, described below with respect to FIGS. 8 and 9.

At block 170, the avatar creator 100 generates transitions and applies intonation for the visemes and phonemes generated at block 160, described below with respect to FIGS. 10-13.

At block 180, the avatar creator 100 generates and stores a machine generated avatar comprising video and audio based on the utterance entered by the user 190, described below with respect to FIGS. 14 and 15.

Figure 2:
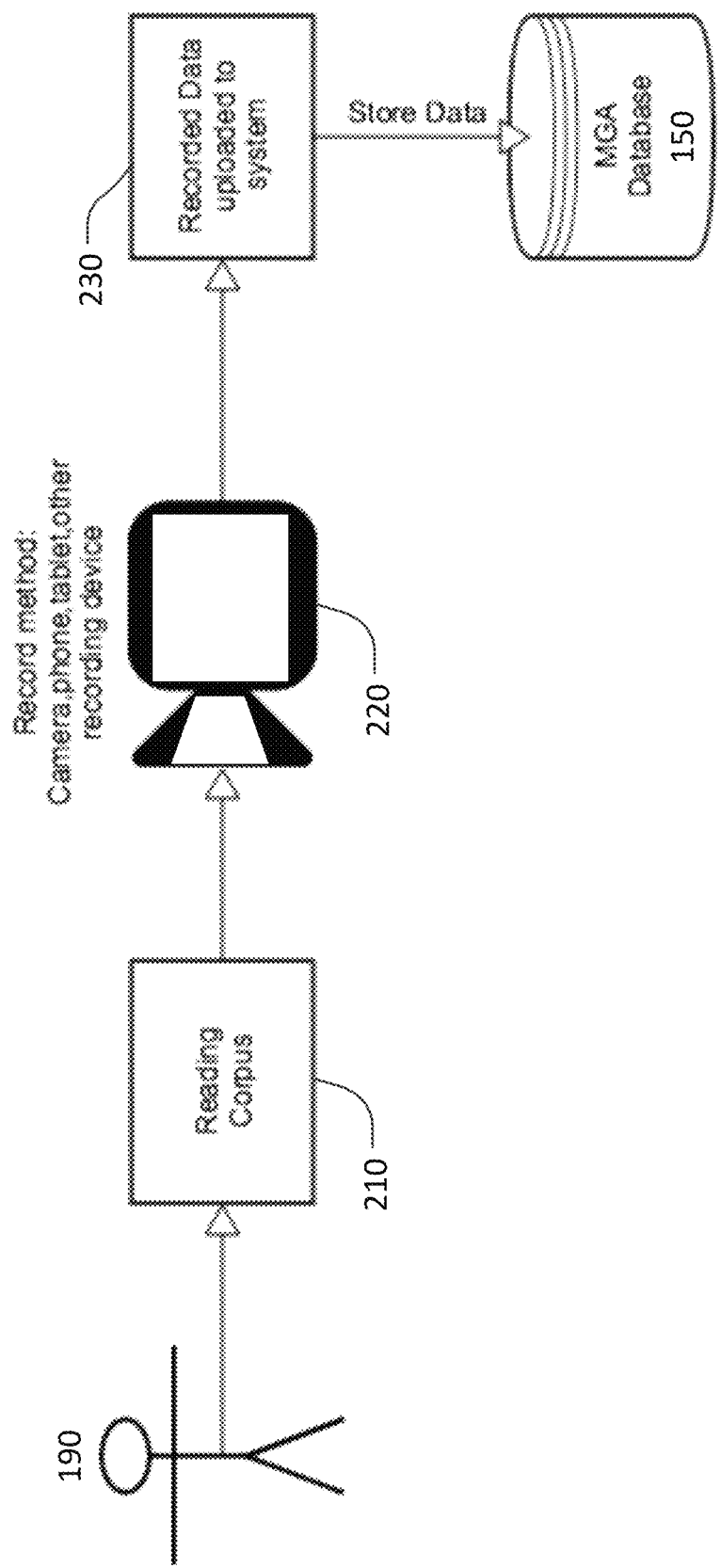
FIG. 2 depicts an example process for recording video and audio information of an actor reading corpora.

FIG. 2 depicts an example process for recording video and audio information of an actor 190 reading a specific corpus of words. At block 210, a user 190 receives a reading corpus. At block 220, the user 190 is recorded reading the corpus. The recording may be performed by a camera, phone, tablet, or other suitable recording device. At block 230, the recorded data is uploaded and stored in the MGA 150. The avatar creator 100 has now obtained video and audio recording of an actor 190 reading corpora for use by the training models, described below.

Figure 3:
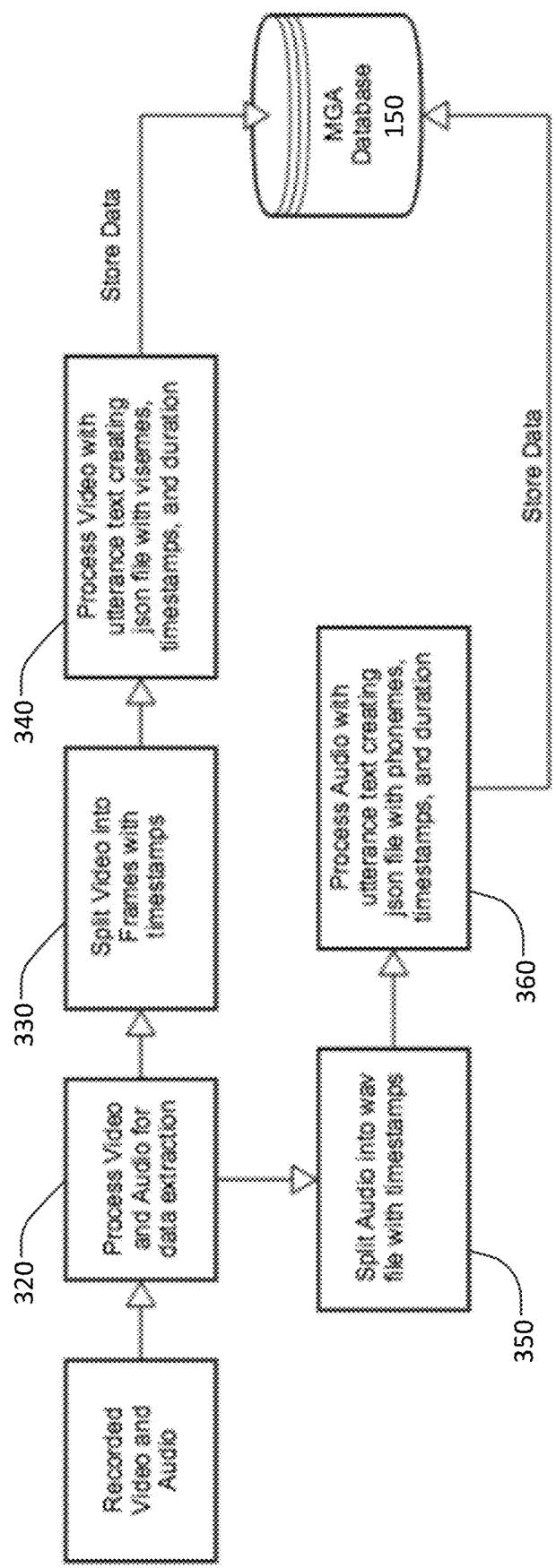
FIG. 3 depicts an example process for extracting data from recorded video and audio with timestamps, phoneme times, phonemes, and visemes.

FIG. 3 depicts an example process for extracting data from recorded video and audio with timestamps, phoneme times, phonemes, and visemes. At block 320, the avatar creator 100 begins the process of extracting and transforming information from the video and audio recordings received via the process of FIG. 2 by separating the audio from the video. Both the audio and video may be timestamped so that they may be matched again after they are separated and analysis may be performed on matching video frames to audio clips. At block 330, the avatar creator 100 splits the recorded video into individual frames, with each having a corresponding timestamp. At block 340, the avatar creator 100 processes the video with the utterance text, which is the corpora the actor 190 read during the process of FIG. 2, to create a json file with visemes, timestamps, and duration information. This data is then stored in the MGA 150. At block 350, the avatar creator 100 splits the recorded audio into sound files, such as .wav files, with each having a corresponding timestamp. At block 360, the avatar creator 100 processes the audio with the utterance text to create a json file with phonemes, timestamps, and duration information, which is then stored in the MGA 150.

Figure 4:
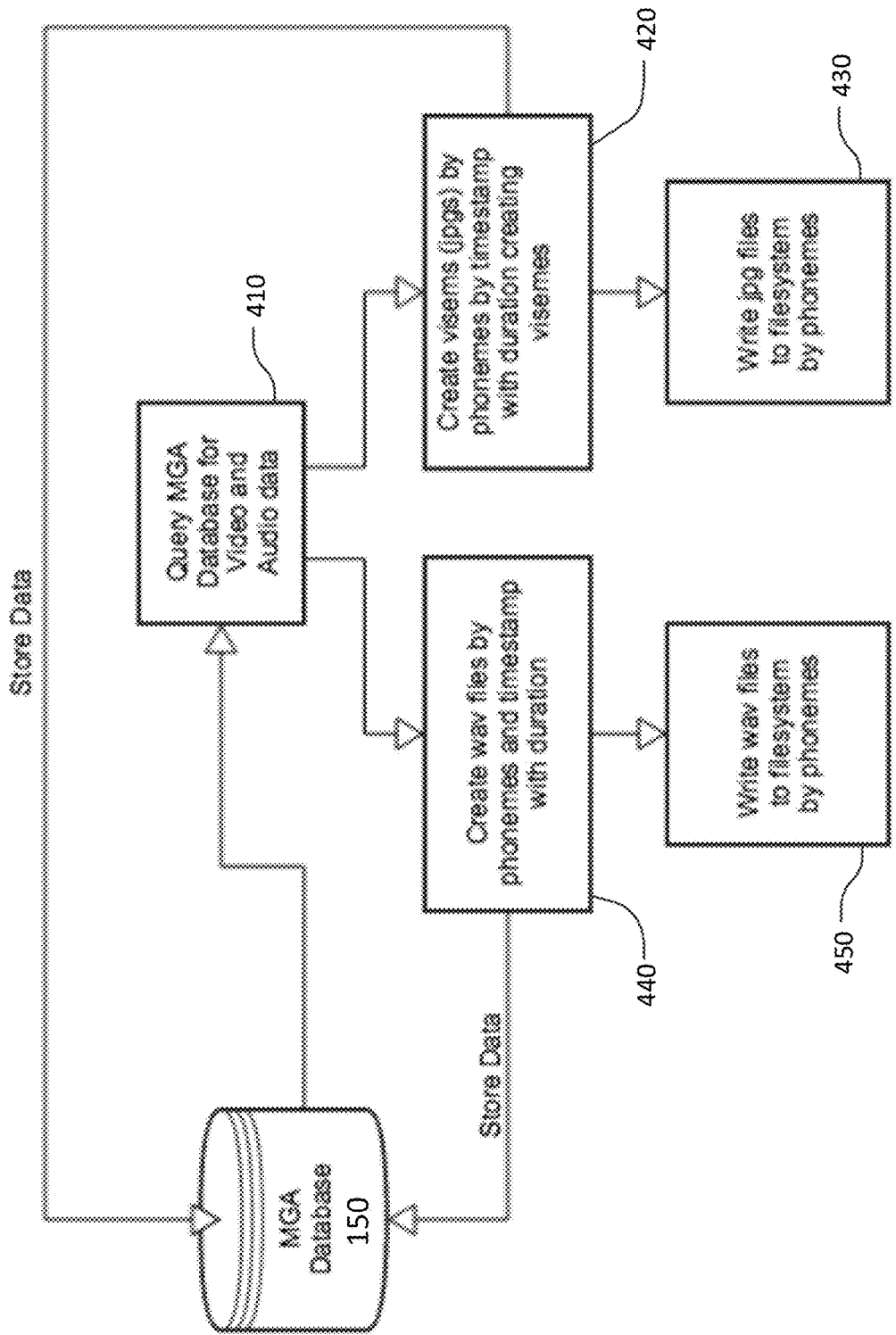
FIG. 4 depicts an example process for transforming and storing extracted video and audio data into individual phoneme and viseme clips based on timing markers.

FIG. 4 depicts an example process for transforming and storing extracted video and audio data into individual phoneme and viseme clips based on the timings markers generated during the process depicted in FIG. 3. At block 410, the avatar creator 100 queries the MGA 150 for the video and audio data generated during the process of FIG. 3. The avatar creator 100 then processes each separately.

At block 420, the avatar creator 100 generates a series of visemes, which may be images such as .jpg images, by matching timestamp and duration information with the phonemes. This may be accomplished using the json files created during the process of FIG. 3. These images matched with corresponding sound create visemes, which are then stored in the MGA 150. At block 430, the image files are written to a storage system, such as a filesystem where the avatar creator 100 is stored, and organized by phoneme.

At block 440, the avatar creator 100 generates a series of sound files, such as .wav files, by matching timestamp and duration information. This may be accomplished using the json files created during the process of FIG. 3. These sound files are then stored in the MGA 150. At block 450, the sound files are written to a storage system and organized by phoneme.

Figure 5:
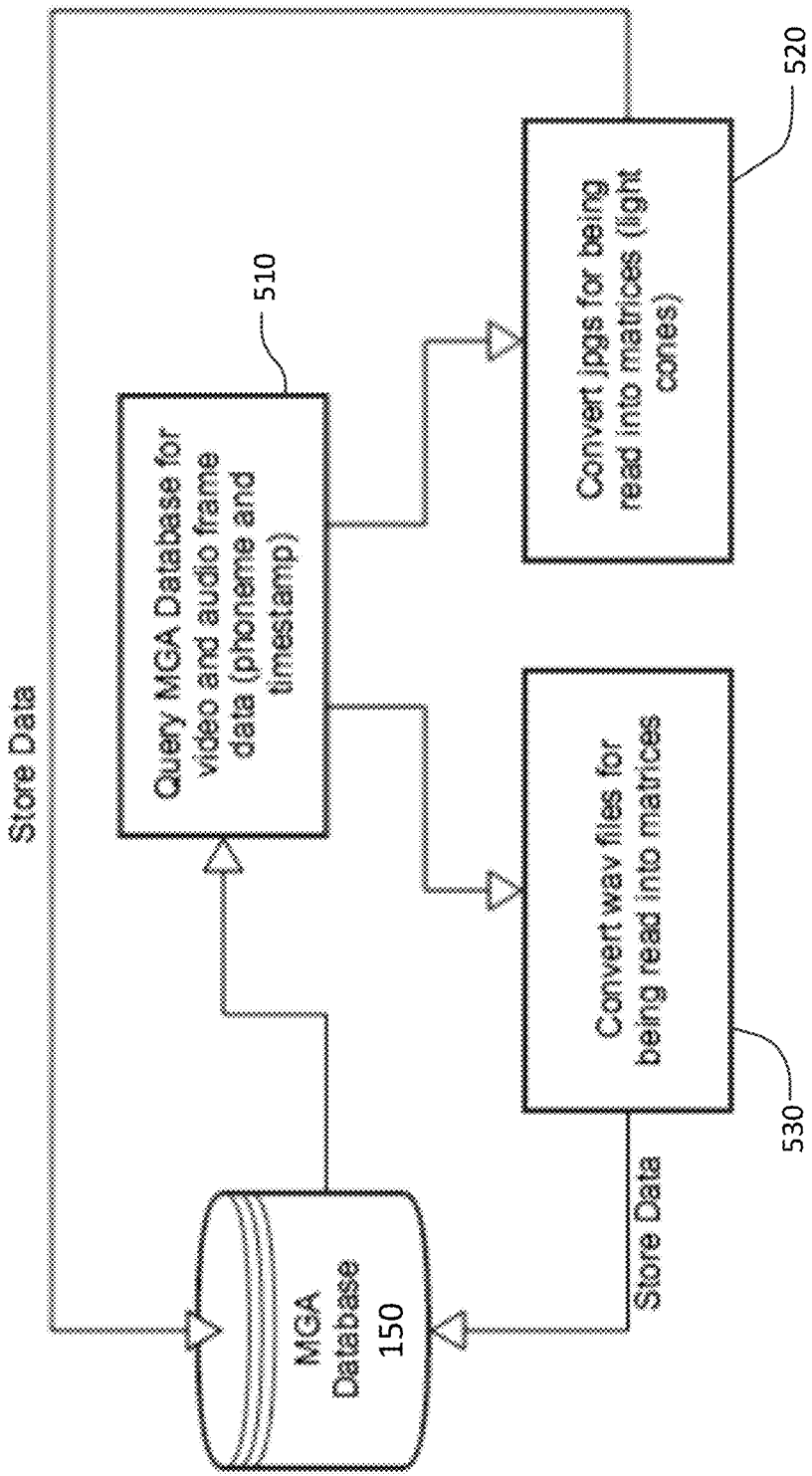
FIG. 5 depicts an example process for extracting transition light cones and audio clips based on phoneme timing markers.

FIG. 5 depicts an example process for extracting transition light cones and audio clips from the image files and sound files generated during the process of FIG. 4. The extraction process may be based on the phoneme timing markers generated in previous processes. At block 510, the avatar creator 100 queries the MGA 150 for the video and audio frame data generated during the process of FIG. 4. The avatar creator 100 then processes each separately. At block 520, the avatar creator 100 processes the image files to extract light cones from them. The light cone data is then entered into one or more matrices, which may be stored in the MGA 150. Light cone data may be matched with phoneme data in the matrices so that a light cone may be found by a corresponding phoneme. At block 530, the avatar creator 100 processes the sound files by phoneme and enters this data into the one or more matrices, which may be stored in the MGA 150.

Figure 6:
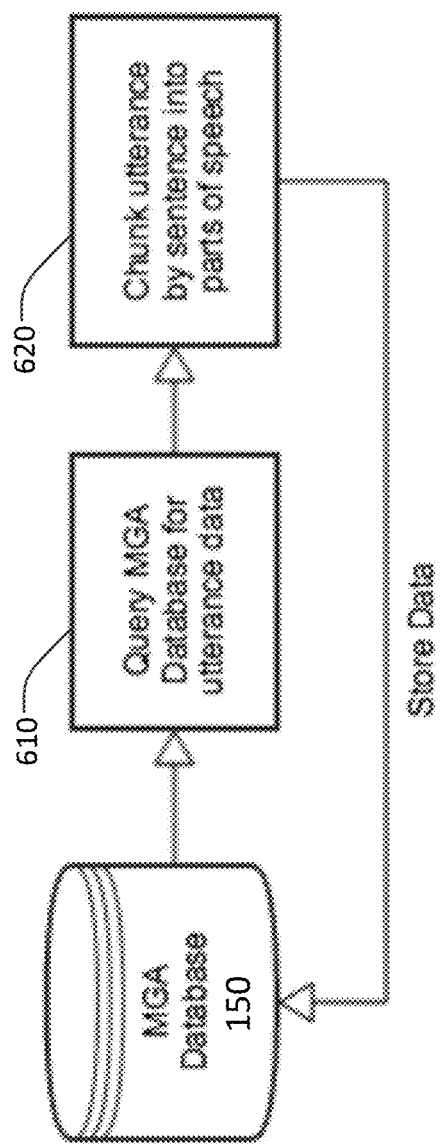
FIG. 6 depicts an example process for chunking sentences and tagging the chunks with parts of speech for training a modulation model.

FIG. 6 depicts an example process for chunking sentences and tagging the chunks with parts of speech for training a modulation model. At block 610, the avatar creator 100 queries the MGA 150 for the corpora recorded during the process of FIG. 2. Then, at block 20, the avatar creator 100 separates, or chunks, the corpora into sentences and tags each word of each sentence with its part of speech. The chunked and tagged data is then stored in the MGA 150.

Figure 7:
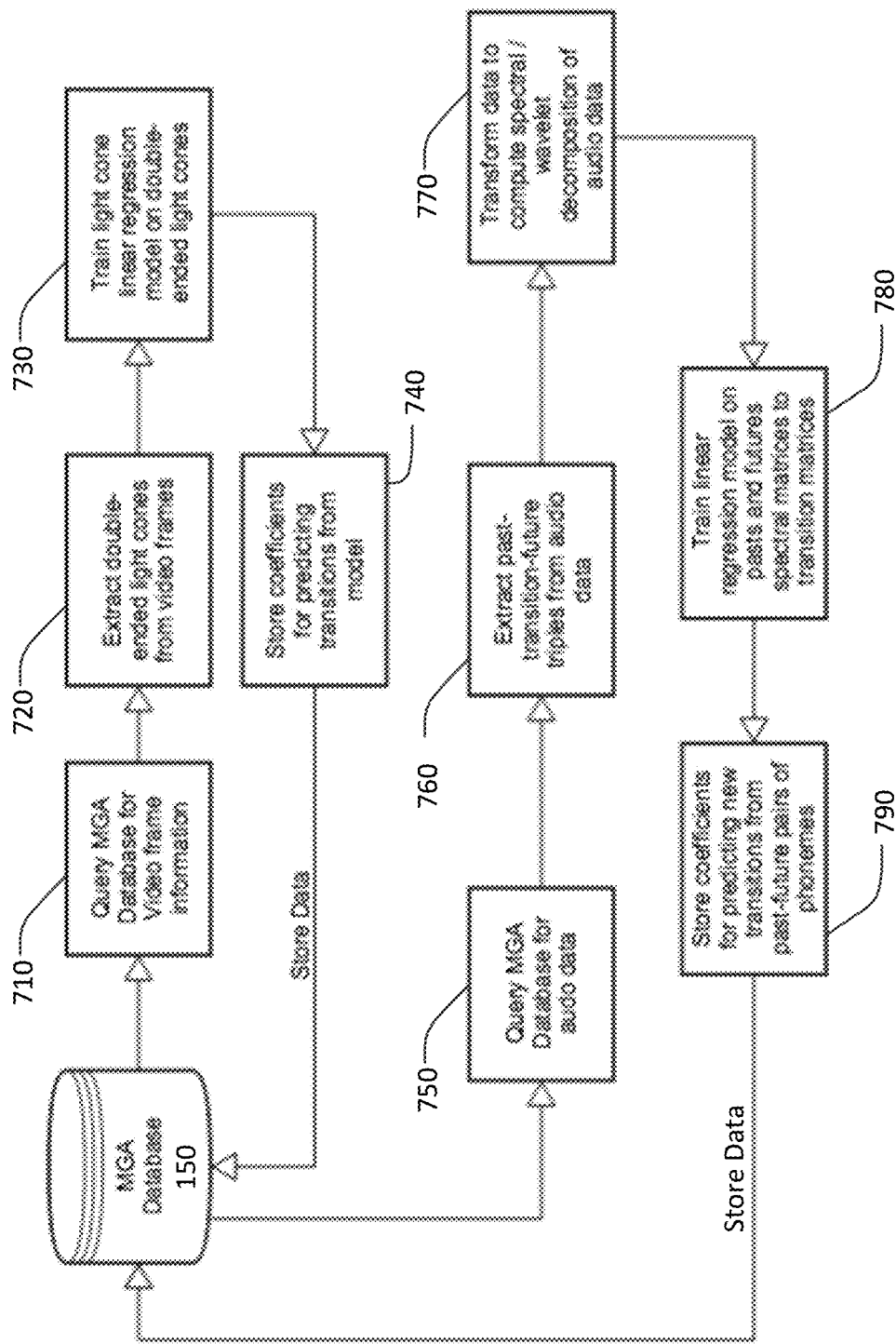
FIG. 7 depicts an example process for training a light cone model for viseme transitions and an audio model for phoneme transitions.

FIG. 7 depicts an example process for training a light cone model for viseme transitions and training an audio model for phoneme transitions. The light cone model and the audio model begin with no data and are not able to predict or generate any video data or audio data. The models are trained separately.

At block 710, the avatar creator 100 queries the MGA 150 for video frames generated during a previous process. At block 720, the avatar creator 100 extracts double-ended light cones from the video frames. At block 730, the avatar creator 100 uses the double-ended light cones to train a light cone linear regression model. At block 740, the avatar creator 100 stores the coefficients of the light cone linear regression model in the MGA 150, which will be used for predicting image transitions.

At block 750, the avatar creator 100 queries the MGA 150 for audio data generated during a previous process. At block 760, the avatar creator 100 extracts past-transition-future triples from the audio data. At block 770, the avatar creator 100 transforms this extracted data into matrix form by computing the spectral/wavelet decomposition of the audio data. After the transformation, there may be pasts and futures spectral matrices and transition matrices. At block 780, the avatar creator 100 trains an audio linear regression model on the pasts and futures spectral matrices to the transition matrices, allowing the audio model to predict transitions based on past-future pairs of phonemes. At block 790, the avatar creator 100 stores the coefficients of the audio linear regression model in the MGA 150.

The processing and training steps may now be complete. The avatar creator 100 has obtained a video and audio recording of an actor reading corpora, timestamped the video data with phoneme times, extracted phoneme and viseme clips based on the timestamping, stored the individual phoneme and viseme instances, extracted transition light cones and audio clips from the recorded corpora based on the phoneme timestamps, chunked sentences and tagged the words of the sentences with parts of speech, trained a modulation model on the tagged sentences, trained a light cone model for viseme transitions, and trained an audio model on phoneme transitions.

A user 190 may now input an utterance to the avatar creator 100 that he would like a generated avatar to speak. If input as spoken word by the user 190, this utterance may be converted to text via any suitable speech-to-text mechanism to simplify processing. The input utterance is then used for the processes depicted in FIGS. 8-15.

Figure 8:
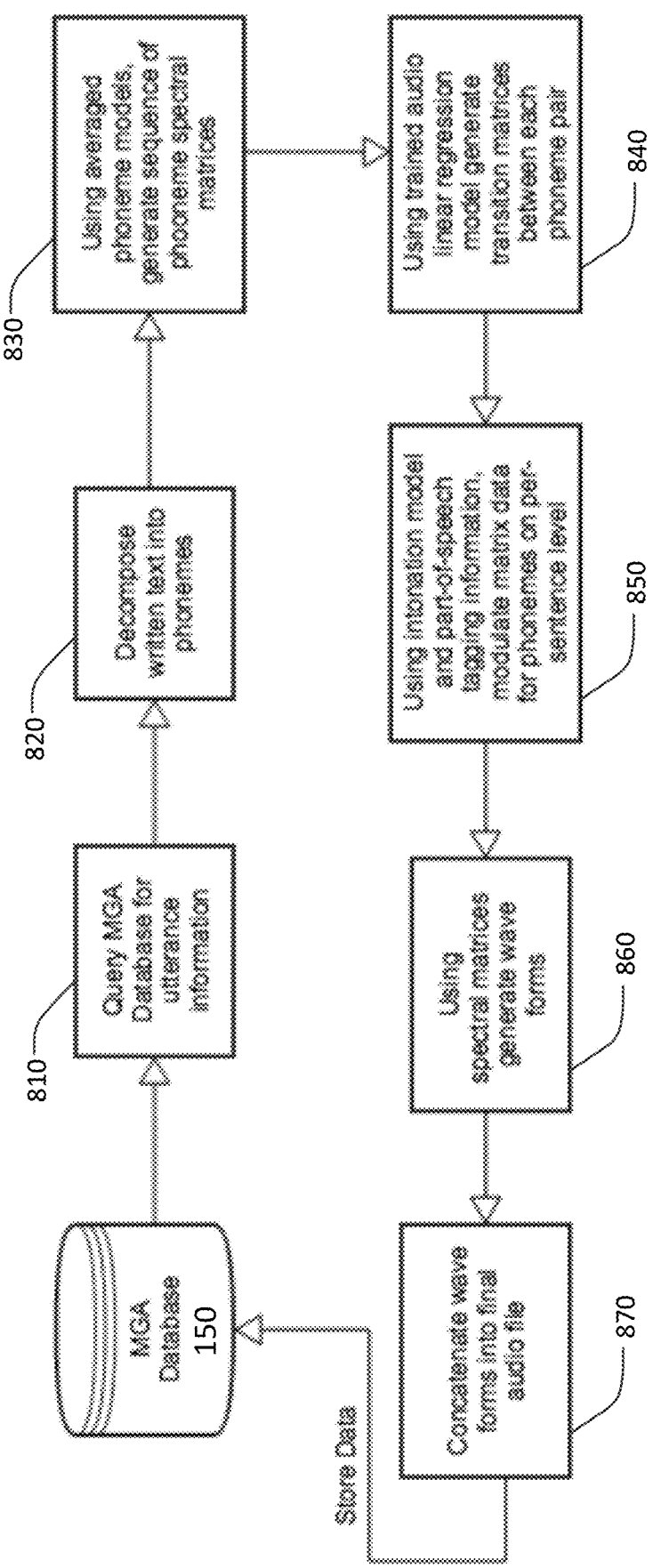
FIG. 8 depicts an example process for generating a viseme and phoneme sequence.

FIG. 8 depicts an example process for generating a viseme and phoneme sequence for the avatar using the trained models. At block 810, the avatar creator 100 queries the MGA 150 for the input utterance. At block 820, the avatar creator 100 decomposes the written text into phonemes. At block 830, the avatar creator 100 uses averaged phoneme models to generate a sequence of phoneme spectral matrices. At block 840, the avatar creator 100 uses the trained audio linear regression model to generate transition matrices between each phoneme pair. At block 850, the avatar creator 100 then uses the intonation model and parts-of-speech tagging information to modulate the matrix data for phonemes on a per-sentence level. At block 860, the avatar creator 100 then uses the generated spectral matrices to generate wave forms, and finally, at block 870, the wave forms are concatenated into the final audio file, which is then stored in the MGA 150 for use by the avatar.

Figure 9:
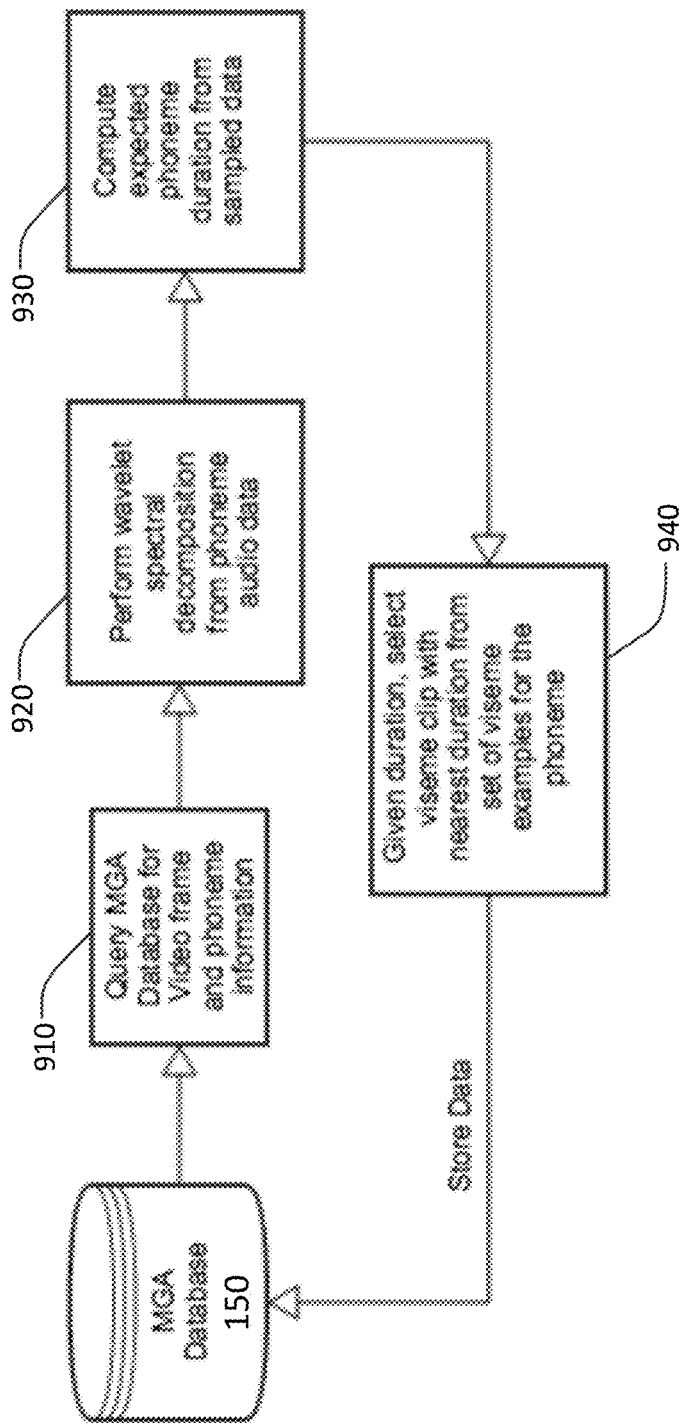
FIG. 9 depicts an example process for generating phoneme matrices and matching corresponding viseme clips based on phoneme and duration.

FIG. 9 depicts an example process for generating phoneme matrices and matching corresponding viseme clips based on phoneme and duration. At block 910, the avatar creator 100 queries the MGA 150 for video frame and phoneme information. At block 920, the avatar creator 100 computes a wavelet spectral decomposition from the phoneme audio data generated during the process of FIG. 8. At block 930, the avatar creator 100 computes an expected phoneme duration from the sampled audio data. At block 940, the avatar creator 100 selects the viseme clip from the set of viseme examples for the phoneme that has the nearest duration to that of the expected duration. This clip is then stored in the MGA 150 for use by the avatar.

Figure 10:
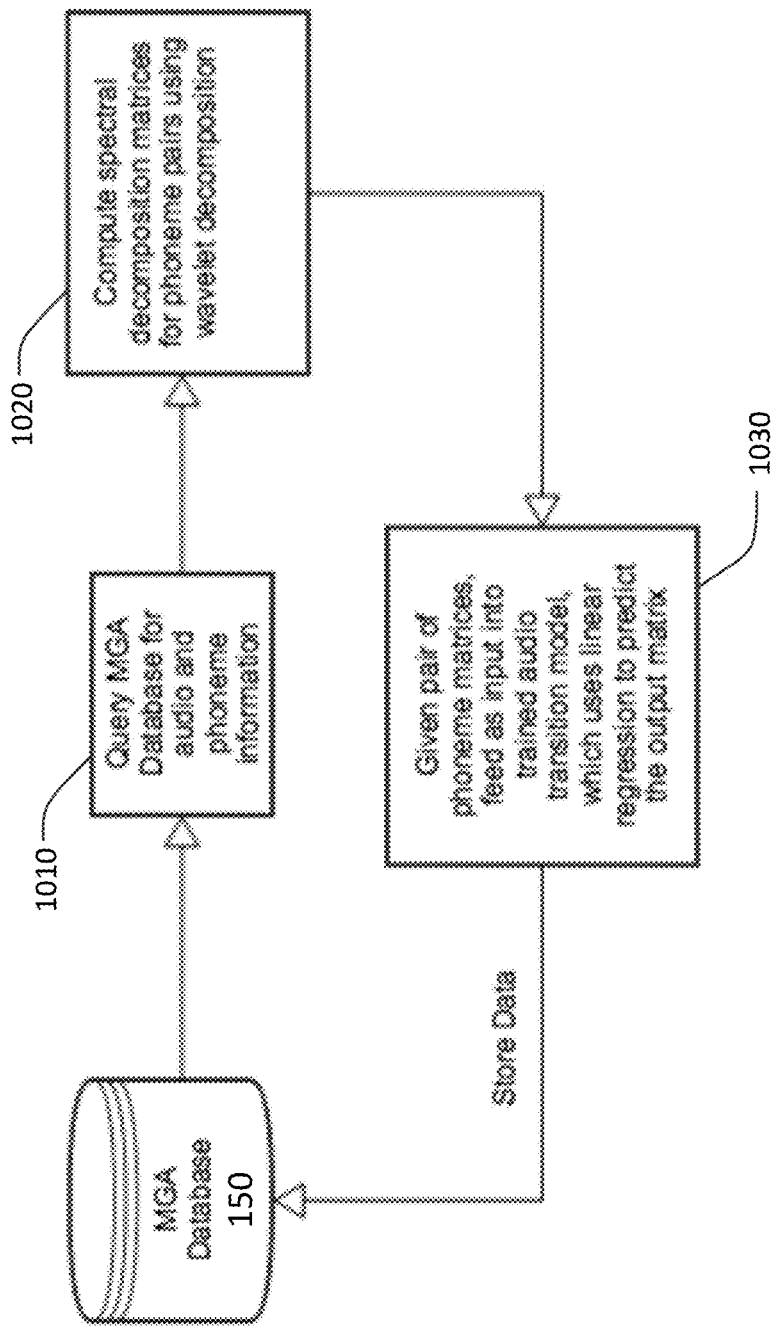
FIG. 10 depicts an example process for generating transition matrices for phoneme pairs based on a trained audio model.

FIG. 10 depicts an example process for generating transition matrices for phoneme pairs based on the trained audio linear regression model. At block 1010, the avatar creator 100 queries the MGA 150 for the audio and phoneme information generated during the process of FIG. 8. At block 1020, the avatar creator 100 computes spectral decomposition matrices for phoneme pairs using wavelet decomposition. Then, at block 1030, the avatar creator 100 uses the computed phoneme pair matrices as input for the trained audio transition model, which uses linear regression to then predict an output matrix. The output matrix is then stored in the MGA 150.

Figure 11:
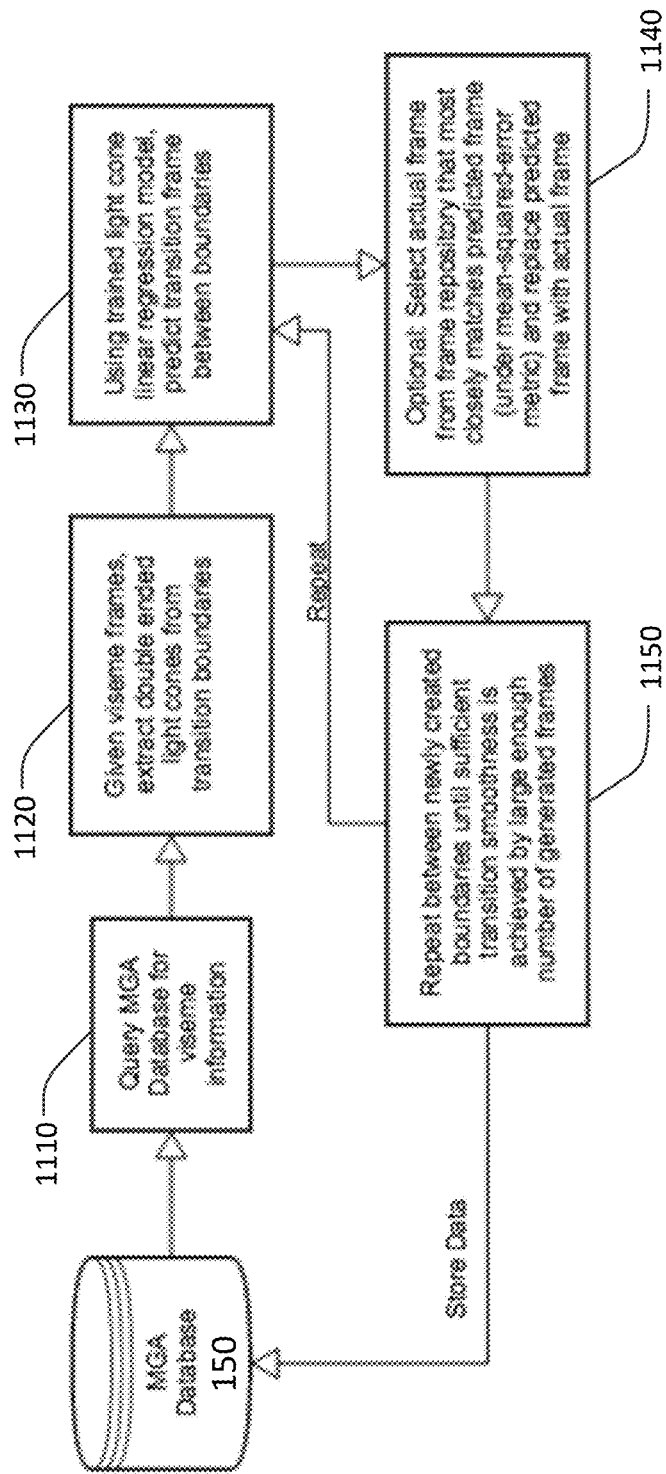
FIG. 11 depicts an example process for generating transition matrices for viseme frames.

FIG. 11 depicts an example process for generating transition matrices for viseme frames based on the trained light cone linear regression model. At block 1110, the avatar creator 100 queries the MGA 150 for the viseme information generated during the process of FIG. 9. At block 1120, the avatar creator 100 extracts double-ended light cones from transition boundaries of the viseme frames. Then, at block 1130, using the trained light cone linear regression model, the avatar creator 100 predicts transition frames between viseme boundaries. Optionally, at block 1140, the avatar creator 100 may select a frame from a frame repository that most closely matches the predicted frame and replace the predicted frame with the selected frame. The matching criterion may be any suitable error metric, such as a mean-squared-error metric. At block 1150, the avatar creator 100 may then repeat the transition prediction process using the linear regression model until sufficient transition smoothness is achieved by a large enough number of generated frames. Sufficient smoothness may be a characteristic that is configured by a user or administrator of the avatar creator 100. This smoothing of transition frames may be repeated for each frame until a predetermined or configured threshold is reached. After the one or more sequences of frames are generated, they are stored in the MGA 150.

Figure 12:
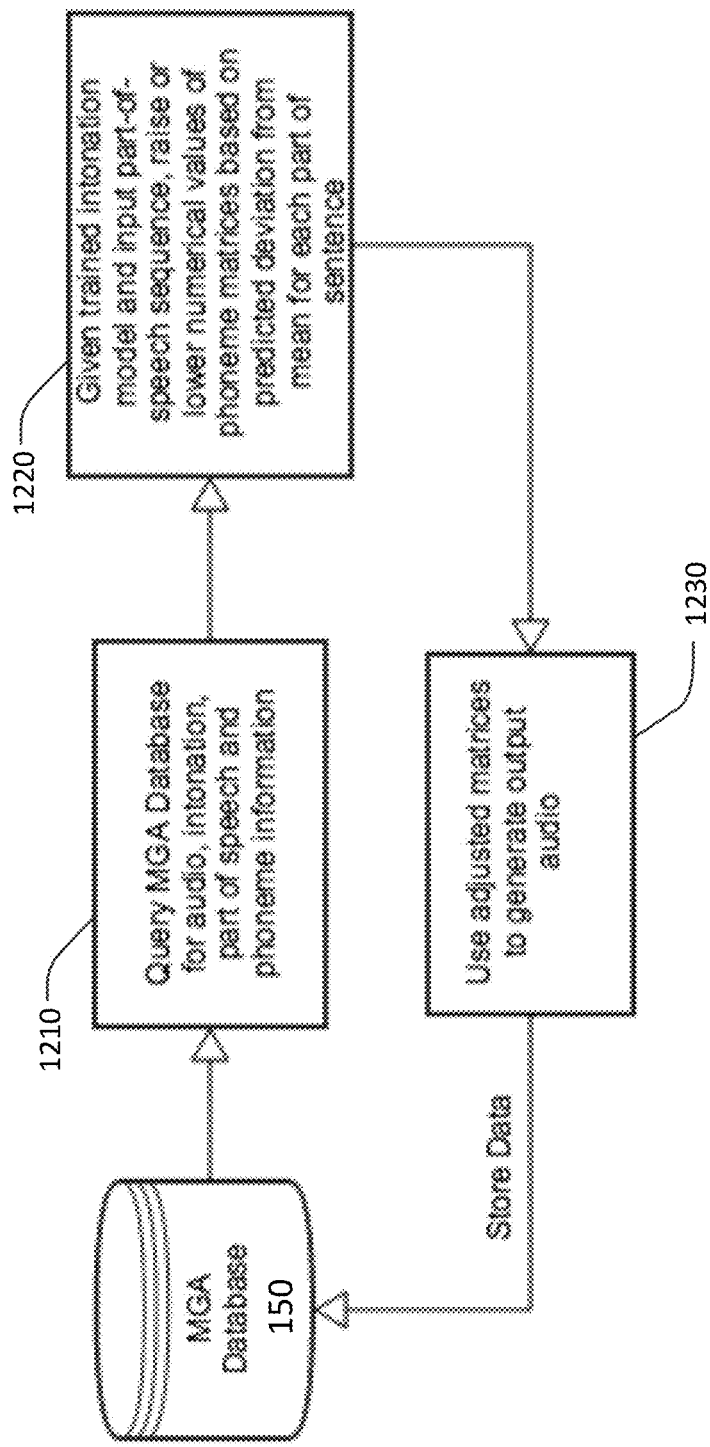
FIG. 12 depicts an example process for modulating phoneme and transition matrices to generate correct intonation.

FIG. 12 depicts an example process for modulating phoneme and transition matrices to generate correct intonation. At block 1210, the avatar creator 100 queries the MGA 150 for the audio, intonation, parts-of-speech, and phoneme information generated during previous processes. At block 1220, using the trained intonation model and part-of-speech sequence, the avatar creator 100 may raise or lower numerical values of phoneme matrices based on a predicted deviation from the mean for each sentence. Then, at block 1230, the avatar creator 100 uses these adjusted matrices to generate output audio. This output audio is then stored in the MGA 150.

Figure 13:
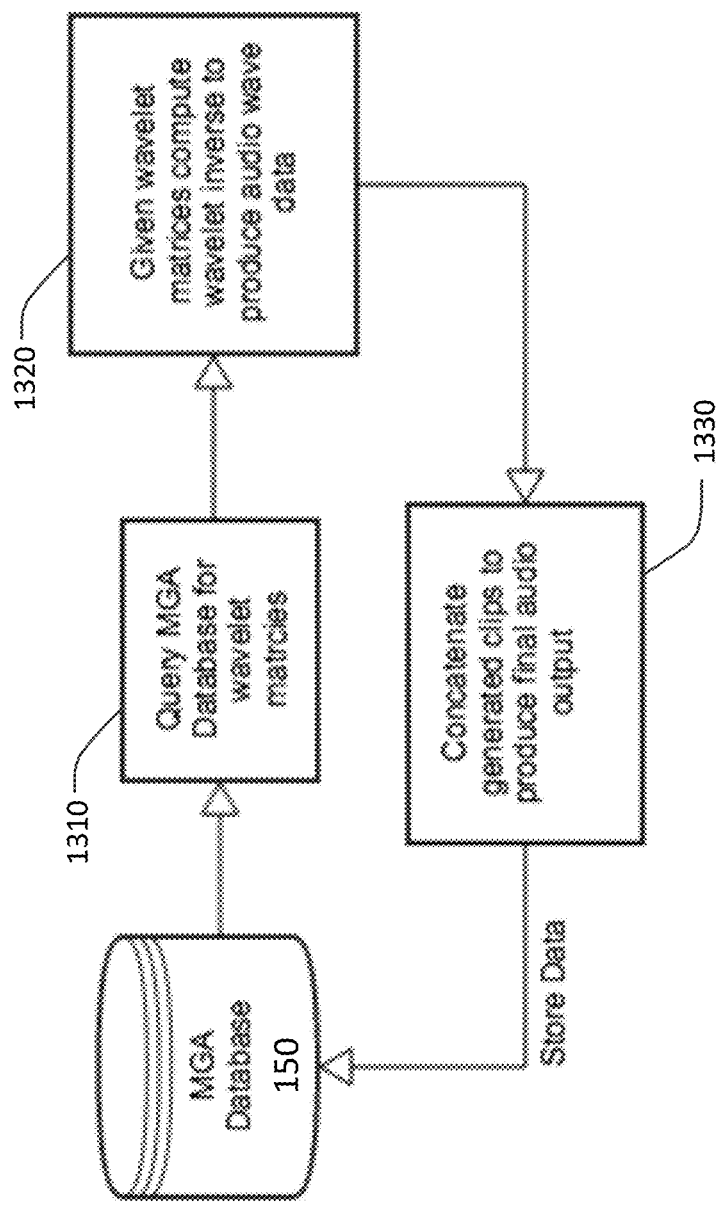
FIG. 13 depicts an example process for generating audio data based on modulated matrices.

FIG. 13 depicts an example process for generating audio data based on modulated matrices. At block 1310, the avatar creator 100 queries the MGA 150 for the wavelet matrices generated during a previous process. At block 1320, the avatar creator 100 uses the wavelet matrices to compute a wavelet inverse, which generates clips of audio wave data. At block 1330, these generated clips are concatenated to produce the final audio output for use by the avatar, which is then stored in the MGA 150.

Figure 14:
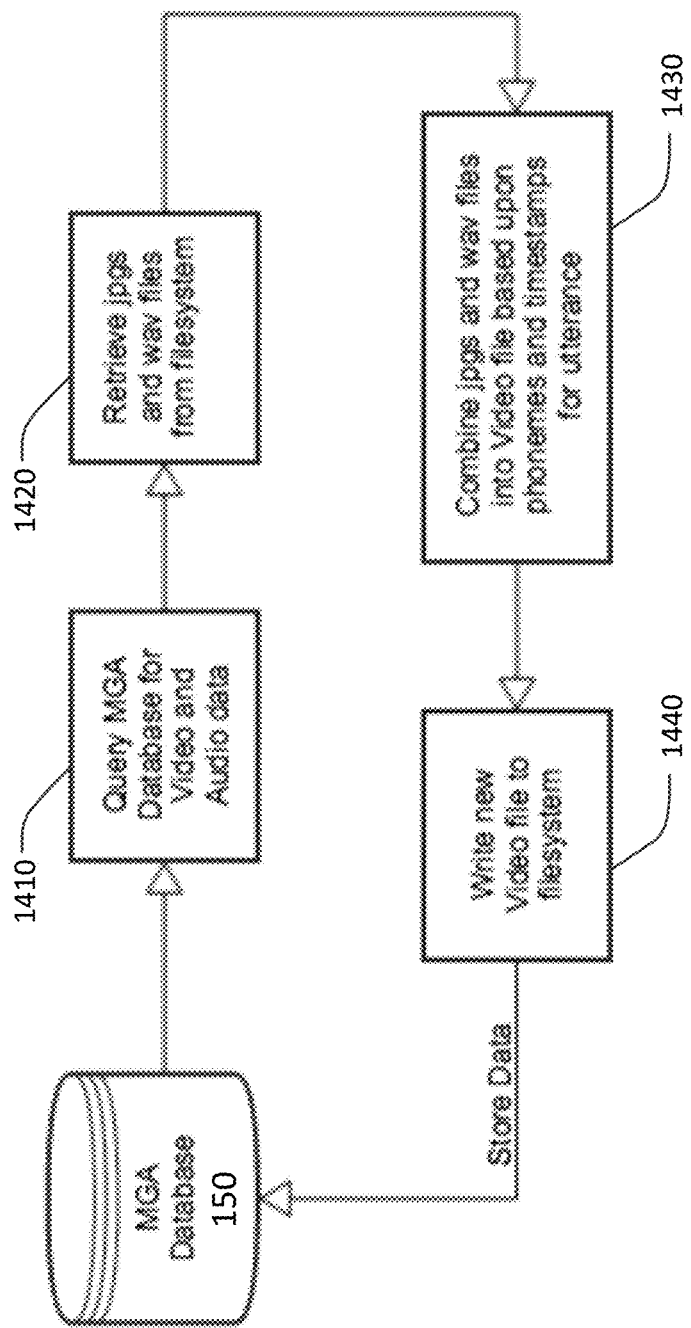
FIG. 14 depicts an example process for combining audio data with visual frames.

FIG. 14 depicts an example process for combining audio data with visual frames. At block 1410, the avatar creator 100 queries the MGA 150 for the generated video and audio data. At block 1420, the avatar creator 100 retrieves the image files and sound files previously saved to a storage system, such as a filesystem, during the process of FIG. 4. At block 1430, the avatar creator 100 combines the images and the sound files into a video file based on the phonemes of the input utterance and the timestamps of the corpora recorded during the process of FIG. 2. At block 1440, this generated video file is saved to a storage system, such as a filesystem, for convenient access. The generated video file is also stored in the MGA 150. The user 190 may now watch the generated video file, which is the generated avatar speaking the input utterance.

Figure 15:
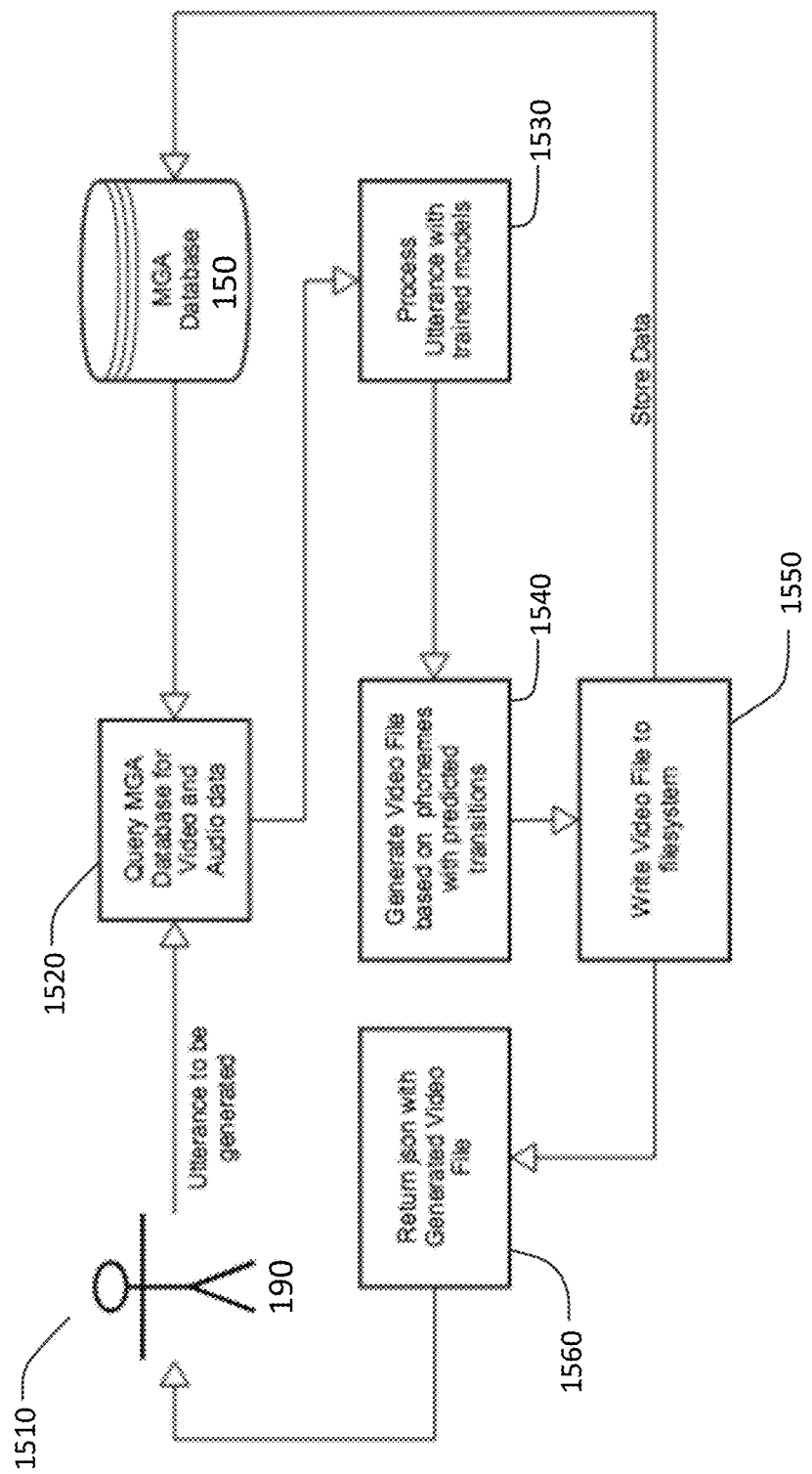
FIG. 15 depicts an example process for illustrating text or spoken input and generating an avatar.

FIG. 15 depicts an example process overview for generating an avatar. At block 1510, a user 190 inputs an utterance to be spoken by the generated avatar. At block 1520, the avatar creator 100 queries the MGA 150 for processed video and audio data. At block 1530, the avatar creator 100 processes the utterance with the trained audio, video, and modulation models. At block 1540, the avatar creator 100 generates a video file based on phonemes with predicted transitions, and, at block 1550, stores this generated video file in a storage system and in the MGA 150. At block 1560, the avatar creator 100 transmits a json with the generated video file to the user 190, who may then watch the video file depicting an avatar speaking the input utterance.

The avatar generation process is now complete. The avatar creator 100 may generate an avatar speaking any utterance by repeating the processing depicted in FIGS. 8-15: receiving an input utterance, generating a phoneme sequence based on the input utterance from the user 190, generating phoneme matrices and matching corresponding viseme clips based on phoneme and duration, generating transition matrices for phoneme pairs based on the trained audio linear regression model, generating transition matrices for viseme frames based on the trained light cone linear regression model, modulating phoneme and transition matrices to generate correct intonation, generating audio data based on the modulated matrices, and combining the audio data with visual frames to generate a video.

Although FIGS. 1-15 are depicted as a sequence of blocks, the depicted sequence should not be construed as limiting the scope of the present disclosure. In various cases, aspects, and embodiments, the blocks and described operations may be altered, omitted, reordered, or performed in parallel.

Figure 16:
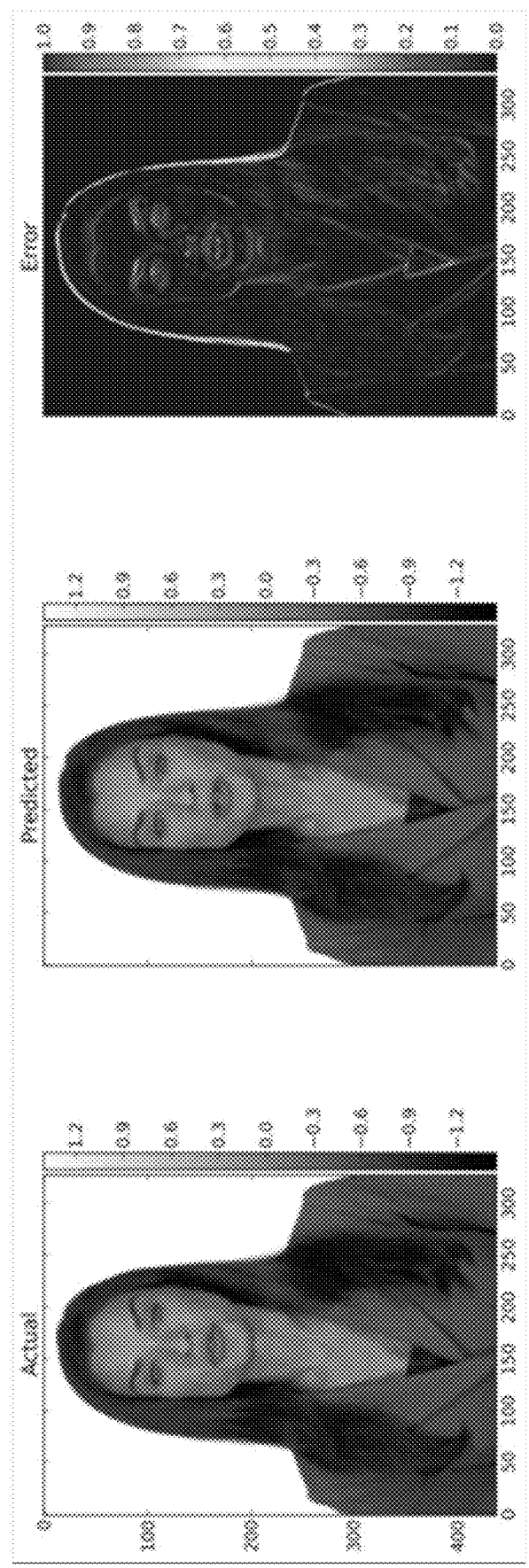
FIG. 16 depicts example footage and body prediction.

FIG. 16 depicts images comparing an actual facial expression of a recorded user 190 with a predicted one. The left image depicts a frame recorded by a female user 190 during a process such as that of FIG. 2. The center image depicts a predicted frame, using the above methods, of the female user 190 for the same spoken syllable as that of the left image. The right image is an overlay of the left and center images, highlighting the error between the two images in white. Notice that most of the image is black, indicating very little error.

Figure 17:
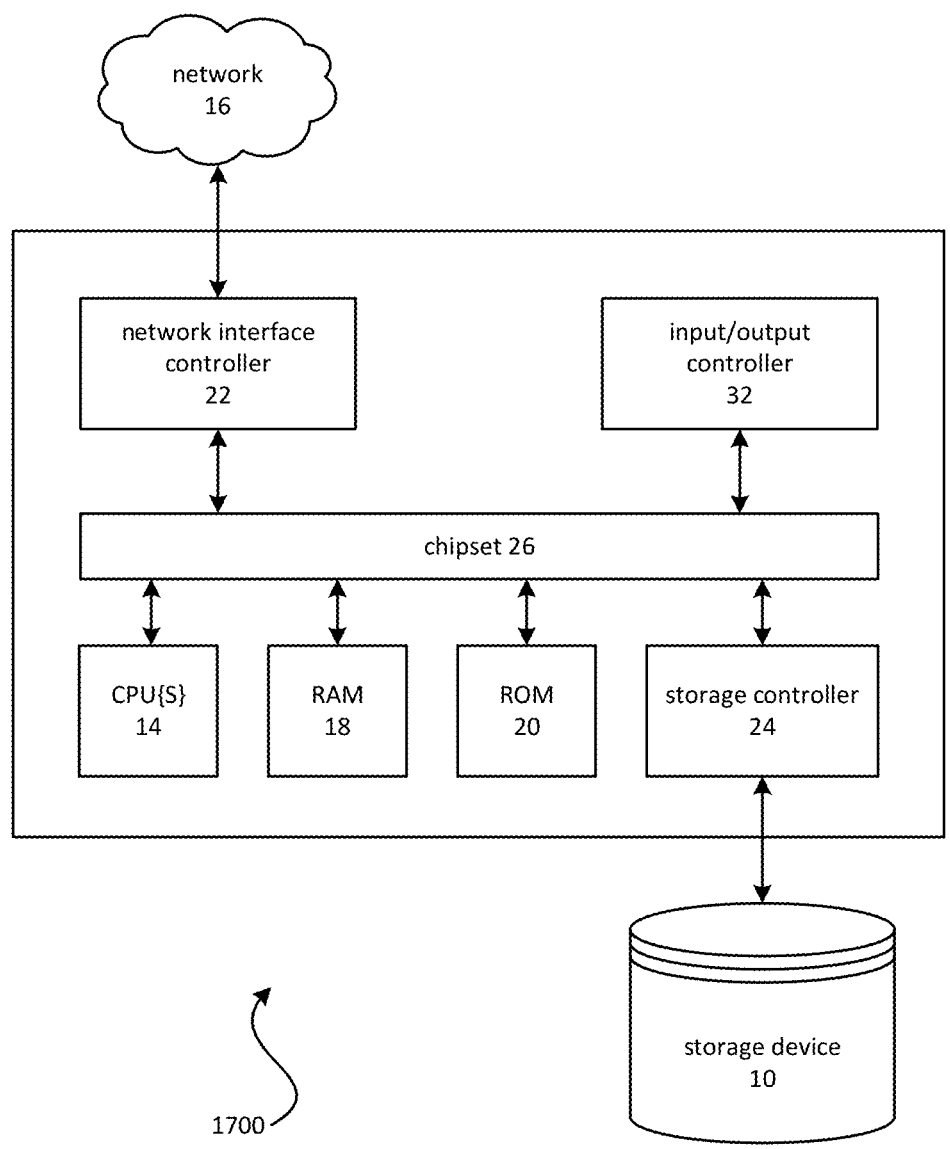
FIG. 17 depicts an example computing system.

FIG. 17 depicts an example computing device in which various components described herein may be embodied, such as any of the various devices depicted in FIGS. 1-15. The computer architecture shown in FIG. 17 may correspond to a set-top box, remote control device, home automation system, desktop computer, laptop, tablet, network appliance, e-reader, smartphone, the MGA 150, or other computing device, and may be utilized to execute any aspects of the components described herein, such as to implement the operating procedures of FIGS. 1-15 or aid in the creation of any of the images of FIG. 16.

A computing device 1700 may include a baseboard, or "motherboard," which is a printed circuit board to which a multitude of components or devices may be connected by way of a system bus or other electrical communication paths. One or more central processing units ("CPUs") 14 may operate in conjunction with a chipset 26. The CPU(s) 14 may be standard programmable processors that perform arithmetic and logical operations necessary for the operation of the computing device 1700.

The CPU(s) 14 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 14 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 26 may provide an interface between the CPU(s) 14 and the remainder of the components and devices on the baseboard. The chipset 26 may provide an interface to a random access memory ("RAM") 18 used as the main memory in the computing device 1700. The chipset 26 may further provide an interface to a computer-readable storage medium, such as a read-only memory ("ROM") 20 or non-volatile RAM ("NVRAM") (not shown), for storing basic routines that may help to start up the computing device 1700 and to transfer information between the various components and devices. The ROM 20 or NVRAM may also store other software components necessary for the operation of the computing device 1700 in accordance with the aspects described herein.

The computing device 1700 may operate in a networked environment using logical connections to remote computing nodes and computer systems through a local area network ("LAN") 16. The chipset 26 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 1700, connecting the computing device to other types of networks and remote computer systems.

The computing device 1700 may be connected to a mass storage device 10 that provides non-volatile storage for the computing device 1700. The mass storage device 10 may store system programs, application programs, other program modules, and data, used to implement the processes and systems described in greater detail herein. The mass storage device 10 may be connected to computing device 1700 through a storage controller 24 connected to the chipset 26. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1700 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 1700 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 may further read information from the mass storage device 10 by detecting the physical states or characteristics of one or more particular locations within the physical storage units.

In addition to the mass storage device 10 described above, the computing device 1700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 1700. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 1700.

The mass storage device 10 or other computer-readable storage media may also be encoded with computer-executable instructions, which, when loaded into the computing device 1700, transforms the computing device from a general-purpose computing system into a special-purpose computer capable of implementing the aspects described herein. These computer-executable instructions transform the computing device 1700 by specifying how the CPU(s) 14 transition between states, as described above. The computing device 1700 may have access to computer-readable storage media storing computer-executable instructions, which, when executed by the computing device 1700, may perform operating procedures depicted in FIGS. 1-15 or aid in the creation of any of the images of FIG. 16.

The computing device 1700 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 1700 may not include all of the components shown in FIG. 17, may include other components that are not explicitly shown in FIG. 17, or may utilize an architecture completely different than that shown in FIG. 17.

As described herein, a computing node may be a physical computing device, such as the computing device 1700 of FIG. 17. A computing node may also include a virtual machine host process and one or more virtual machine instances operating on a physical computing device, such as the computing device 1700. Computer-executable instructions may be executed by the physical hardware of a computing device indirectly through interpretation and/or execution of instructions stored and executed in the context of a virtual machine.

Applicant has described methods and systems for the creation of machine-generated avatars. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-executable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A method for implementing a machine-generated avatar, the method comprising:
   receiving data indicative of an input utterance;
   generating one or more phoneme sequences based on the data indicative of the input utterance;
   generating phoneme matrices comprising values based on one or more corresponding phonemes of the one or more phoneme sequences;
   matching, based on phoneme and duration, corresponding viseme clips to the phoneme matrices;
   generating transition matrices for phoneme pairs using a trained audio linear regression model;
   generating transition matrices for viseme frames based on a trained light cone linear regression model;
   modulating the phoneme matrices and the transition matrices for phoneme pairs to generate correct intonation using a trained modulation model;
   generating an audio track based on the modulated matrices;
   combining the audio track with visual frames; and
   causing storage of the combined audio track and visual frames.

2. The method of claim 1, further comprising causing output of an avatar based on the stored combined audio track and visual frames.

3. The method of claim 1, wherein modulating the phoneme matrices and the transition matrices for the phoneme pairs comprises one or more of raising or lowering the values of the phoneme matrices based on a trained intonation model.

4. The method of claim 1, further comprising generating the visual frames based on the transition matrices for the viseme frames.

5. The method of claim 1, wherein generating the transition matrices for phoneme pairs comprises determining spectral decomposition matrices for phoneme pairs using a wavelet decomposition and applying the audio linear regression model to the spectral decomposition matrices for phoneme pairs.

6. The method of claim 1, wherein generating the transition matrices for viseme frames comprises extracting double-ended light cones from transition boundaries of the viseme frames and using the trained light cone linear regression model to predict transition frames between the transition boundaries.

7. The method of claim 1, further comprising receiving data indicative of an utterance to be spoken by an avatar, and wherein the generating the audio track is based on the data indicative of the utterance.

8. The method of claim 1, further comprising training the audio linear regression model based on the transition matrices, past matrices based on the data indicative of input utterance, and future matrices based on the data indicative of input utterance.

9. A device for implementing a machine-generated avatar, the device comprising:
   one or more processors; and
   memory storing instructions that, when executed by the one or more processors, cause the device to:
   receive data indicative of an input utterance;
   generate one or more phoneme sequences based on the data indicative of the input utterance;
   generate phoneme matrices comprising values based on one or more corresponding phonemes of the one or more phoneme sequences;
   match, based on phoneme and duration, corresponding viseme clips to the phoneme matrices;
   generate transition matrices for phoneme pairs using a trained audio linear regression model;
   generate transition matrices for viseme frames based on a trained light cone linear regression model;
   modulate the phoneme matrices and the transition matrices for phoneme pairs to generate correct intonation using a trained modulation model;
   generate an audio track based on the modulated matrices;
   combine the audio track with visual frames; and
   cause storage of the combined audio track and visual frames.

10. The device of claim 9, wherein the instructions, when executed by the one or more processors, further cause the device to cause output of an avatar based on the stored combined audio track and visual frames.

11. The device of claim 9, wherein the instructions that, when executed by the one or more processors, cause the device to modulate the phoneme matrices and the transition matrices for the phoneme pairs comprises instructions that, when executed by the one or more processors, cause the device to one or more of raise or lower the values of the phoneme matrices based on a trained intonation model.

12. The device of claim 9, wherein the instructions, when executed by the one or more processors, further cause the device to generate the visual frames based on the transition matrices for the viseme frames.

13. The device of claim 9, wherein the instructions that, when executed by the one or more processors, cause the device to generate the transition matrices for phoneme pairs comprises instructions that, when executed by the one or more processors, cause the device to determine spectral decomposition matrices for phoneme pairs using a wavelet decomposition and apply the audio linear regression model to the spectral decomposition matrices for phoneme pairs.

14. The device of claim 9, wherein the instructions that, when executed by the one or more processors, cause the device to generate the transition matrices for viseme frames comprises instructions that, when executed by the one or more processors, cause the device to extract double-ended light cones from transition boundaries of the viseme frames and use the trained light cone linear regression model to predict transition frames between the transition boundaries.

15. The device of claim 9, wherein the instructions, when executed by the one or more processors, further cause the device to receive data indicative of an utterance to be spoken by an avatar, and wherein the audio track is generated based on the data indicative of the utterance.

16. The device of claim 9, wherein the instructions, when executed by the one or more processors, further cause the device to train the audio linear regression model based on the transition matrices, past matrices based on the data indicative of input utterance, and future matrices based on the data indicative of input utterance.

17. A system for implementing a machine-generated avatar, the system comprising:
a storage device; and
a computing device configured to:
receive data indicative of an input utterance;
generate one or more phoneme sequences based on the data indicative of the input utterance;
generate phoneme matrices comprising values based on one or more corresponding phonemes of the one or more phoneme sequences;
match, based on phoneme and duration, corresponding viseme clips to the phoneme matrices;
generate transition matrices for phoneme pairs using a trained audio linear regression model;
generate transition matrices for viseme frames based on a trained light cone linear regression model;
modulate the phoneme matrices and the transition matrices for phoneme pairs to generate correct intonation using a trained modulation model;
generate an audio track based on the modulated matrices;
combine the audio track with visual frames; and
cause the storage device to store the combined audio track and visual frames.

18. The system of claim 17, wherein the computing device is further configured to cause output of an avatar based on the stored combined audio track and visual frames.

19. The system of claim 17, wherein the computing device is configured to modulate the phoneme matrices and the transition matrices for the phoneme pairs based on one or more of raising or lowering values of the phoneme matrices based on a trained intonation model.

20. The system of claim 17, wherein the computing device is configured to generate the transition matrices for phoneme pairs based on determining spectral decomposition matrices for phoneme pairs using a wavelet decomposition and applying the audio linear regression model to the spectral decomposition matrices for phoneme pairs.

* * * * *